(12) United States Patent
Jensen et al.

(10) Patent No.: US 7,467,599 B2
(45) Date of Patent: Dec. 23, 2008

(54) TROUGH FOR PIGLETS

(75) Inventors: Karl J. Jensen, Vejle (DK); Frank B. Andersen, Rødekro (DK); Jens K. Munk, Odense M (DK)

(73) Assignee: Biofiber-Damino A/S (DK)

( * ) Notice: Subject to any disclaimer, the term of this patent is extended or adjusted under 35 U.S.C. 154(b) by 0 days.

(21) Appl. No.: 11/439,037

(22) Filed: May 23, 2006

(65) Prior Publication Data

US 2007/0022963 A1 Feb. 1, 2007

(30) Foreign Application Priority Data

May 23, 2005 (EP) .................................. 05011099

(51) Int. Cl.
*A01K 1/10* (2006.01)
*A01K 5/00* (2006.01)
*A01K 39/00* (2006.01)

(52) U.S. Cl. ...................... 119/61.1; 119/515; 119/409; 119/51.01

(58) Field of Classification Search ................ 119/61.1, 119/51.01, 503, 515, 52.1, 72, 71, 74, 409, 119/408, 401, 410, 411, 449, 454, 456, 521, 119/58, 61.3, 900, 61.31, 61.4; D30/121, D30/131

See application file for complete search history.

(56) References Cited

U.S. PATENT DOCUMENTS

| | | | | | |
|---|---|---|---|---|---|
| 870,849 | A | * | 11/1907 | Ruggles | 119/61.3 |
| 958,558 | A | * | 5/1910 | Stiggleman | 119/61.4 |
| 1,028,445 | A | * | 6/1912 | Dewey | 119/61.3 |
| 1,089,011 | A | * | 3/1914 | Ruggles | 119/61.3 |
| 1,138,365 | A | * | 5/1915 | Enos | 119/61.3 |
| 1,469,013 | A | * | 9/1923 | Jacobus | 119/52.1 |
| 1,742,019 | A | * | 12/1929 | Williams et al. | 119/61.3 |
| 1,755,337 | A | * | 4/1930 | Schettl | 119/61.4 |
| 2,448,707 | A | * | 9/1948 | Erickson et al. | 119/61.31 |
| 2,789,537 | A | * | 4/1957 | Bailey | 119/61.1 |
| 2,956,540 | A | * | 10/1960 | Walton | 119/78 |
| 3,040,706 | A | * | 6/1962 | O'Dell | 119/57.8 |
| 3,089,461 | A | * | 5/1963 | Dunn | 119/57.9 |
| 3,114,350 | A | * | 12/1963 | King et al. | 119/51.01 |
| D241,255 | S | * | 8/1976 | D'Angelo | D30/121 |

(Continued)

FOREIGN PATENT DOCUMENTS

DE 89 05 992 7/1989

(Continued)

OTHER PUBLICATIONS

European Search Report; EP 05 01 1099; Oct. 18, 2005.

(Continued)

*Primary Examiner*—Andrea M Valenti
(74) *Attorney, Agent, or Firm*—Cantor Colburn LLP

(57) ABSTRACT

A trough is disclosed for supplying piglets with mineral supplements in the suckling period. The trough is designed to awaken the piglets' curiosity and thus make them root in the bottom of the trough, where the mineral supplements are dispensed in form of a dry powder mixture, and thus reduce spillage as compared to placing the mineral supplements on the floor of the pen. During the pre-weaning of the piglets the trough can be converted to serve as a normal trough for solid feed.

7 Claims, 3 Drawing Sheets

U.S. PATENT DOCUMENTS

| | | | | |
|---|---|---|---|---|
| 4,258,665 A | * | 3/1981 | Coots | 119/61.31 |
| 4,483,274 A | | 11/1984 | Zmolek et al. | |
| 4,771,735 A | * | 9/1988 | Larsen | 119/62 |
| D423,734 S | * | 4/2000 | Dahl | D30/131 |
| 2006/0272587 A1 | * | 12/2006 | Gordon | 119/61.1 |

FOREIGN PATENT DOCUMENTS

| | | |
|---|---|---|
| GB | 2 021 377 | 12/1979 |
| GB | 2 092 876 | 8/1982 |
| GB | 2 145 316 | 3/1985 |

OTHER PUBLICATIONS

English Translation of DE 89 05 992; Jul. 6, 1989.

* cited by examiner

TROUGH FOR PIGLETS

TECHNICAL FIELD OF THE INVENTION

The present invention relates to a trough for supplying piglets with mineral supplements in the suckling period, in particular iron. In addition the trough can be used for supplying ordinary feed to the piglets during the pre-weaning period.

BRIEF DESCRIPTION OF RELATED ART

The fast-growing piglets of modern pig rearing require supplements of minerals during the suckling period in order to avoid disease and in particular they need iron supplements in order to avoid anaemia. As the piglets obtain an insufficient amount of these minerals from the milk of the sow they have to get them in another way. This is normally done by intramuscular or subcutaneous injection, by manually feeding an iron-containing feed directly to each piglet, by adding iron to the drinking water presented to the piglets, or by mixing the mineral supplements, possibly in form of a dry powder mixture, with the bedding of the farrowing pen. When the piglets root in the bedding they will get the mineral supplement powder on their snout and afterwards ingest it when they lick the powder off. The method of injecting the piglets has the disadvantage of being labour intensive. The method of manually feeding the iron-containing feed to the piglets is also very labour intensive. The method of supplying iron via the drinking water is generally not regarded as safe. The method of mixing the mineral supplements with the bedding demands less work but has the disadvantage that a major part of the supplements are wasted and the net amount of powder used is unnecessarily high.

BRIEF SUMMARY OF THE INVENTION

The invention is configured to supply the mineral supplements to the piglets in a fast and efficient way with minimal loss.

The present invention is a dual purpose trough for piglets. The primary purpose is to supply the piglets with mineral supplements in the suckling period and the secondary purpose is to serve as a normal feeding trough during the pre-weaning of the piglets.

The trough for piglets according to the present invention comprises a longitudinally extending trough for supplying piglets with mineral supplements in form of a dry powder mixture, the trough having an inner bottom, two end walls preventing the piglets from entering the trough from the ends in the longitudinal direction, a first longitudinal outer edge extending substantially the full distance between said two end walls and extending between 0.5 and 6 cm, preferably between 2 and 5 cm above the inner bottom, and a lip extending inward from the said first longitudinal outer edge and for a distance of between 0.5 and 3 cm, preferably between 0.8 and 2.2 cm in the horizontal, transversal direction, the trough extending in the longitudinal direction between 5 and 35 cm, preferably between 20 and 28 cm from one of said end walls to the other.

The present invention exploits the fact that piglets are very curious animals and that they enjoy rooting with their snout. Until the piglets are about 10 days old their sole source of nutrients is the milk from the sow. In nature when piglets root in the dirt during this 10 day period it is out of pure curiosity and not in order to find feed. A trough with the above mentioned properties and dimensions will arouse the piglets' curiosity and encourage them to root in the bottom of the trough, whereby the mineral supplements they need can be supplied to them by putting the supplements in the bottom of the trough in form of a dry powder mixture. When the piglets root in the trough, the mineral supplements will get on their snout where from they will lick it off and thus ingest it into the body. Our tests have shown that the encouragement of the piglets is sufficient to attract all piglets of the litter so that each is given an adequate dose of the dry powder mixture and that the properties and dimensions of the trough at the same time effectively prevents the piglets from entering the trough or cause excessive spillage of the dry powder mixture, whereby the consumption of the dry powder mixture is substantially limited to the amount actually ingested by the piglets. The inner bottom of the trough is preferably arranged near the horizontal level of the pen floor.

In a preferred embodiment the trough has a second longitudinal outer edge extending substantially the full distance between said two end walls and substantially parallel to said first outer edge, the first edge and the second edge defining between them the opening into the interior of the trough. The width of the opening in the transversal direction is advantageously from 5 to 15 cm, preferably from 7 to 11 cm. Preferably the opening defined by said first and said second longitudinal outer edges has an angle to horizontal of between 25 and 60 degrees, preferably between 35 and 55 degrees. These dimensions have shown to be further advantageous probably because the piglets feel more comfort with an opening of these dimensions and are more stimulated to enter the head into such an opening.

It is also preferred that the back cover of the trough extends upward from a longitudinal side of the inner bottom opposite the first longitudinal outer edge so that there is a horizontal distance between the first longitudinal outer edge and the back wall of between 3 cm and 15 cm, preferably of between 6 and 10 cm. Preferably the angle of the back wall between the inner bottom and the horizontal level of the lip lies within the range of 20 to 90 degrees to horizontal, preferably within the range of 30 to 60 degrees so that the back wall extends upwards and away from the inner bottom. These dimensions are further advantageous in encouraging the piglet to root in the bottom of the trough.

In a further preferred embodiment the bottom of the trough is textured in a pattern where the texture extends vertically from 0.1 to 0.4 cm from the general surface of the inner bottom and having a horizontal distance between adjacent textures of 0.5 to 3 cm, preferably of 1 to 2.5 cm. The texture prevents the piglets from eating the dry powder mixture which could increase the powder consumption above the required level for the individual piglet and thereby adding to the costs of feeding the powder to the piglets.

In most embodiments of this invention it would be an advantage that the inner bottom extends horizontally from 1 to 8 cm, preferably from 2 to 6 cm in the transversal direction.

In the period when the piglets is less than 10 days old the trough serves only as means for supplying the piglets with the essential mineral supplements they need, in particular iron supplements, in form of a dry powder mixture. In this configuration the trough is not well suited for supplying the pre-weaning piglets with a suitable amount of solid feed. At the end of the 10 day period the supporting arrangement of the trough enables the trough to be tilted which allows it to contain a suitable amount of feed and thus serve as a normal feeding trough for the pre-weaning piglets.

DESCRIPTION OF THE DRAWING

An embodiment of the present invention is shown in the enclosed drawings of which

DETAILED DESCRIPTION OF THE EMBODIMENTS OF THE PRESENT INVENTION

The trough is designed with the dual purpose to supply the piglets with the mineral supplements they need during the suckling period and to serve as a normal feeding trough for feeding the piglets with solid feed. As the mineral supplements are given in rather small doses compared to the quantity of feed one configuration of the trough is designed to supply the piglets with the mineral supplements and another configuration is designed for feed. When the suckling period is over the trough is converted, e.g. by flipping it over, so that the configuration for normal feeding can be utilized.

It should be appreciated that, in an exemplary embodiment, the bottom 2 of the trough is textured 10 in a pattern where the texture 10 extends vertically from 0.1 to 0.4 cm from the general surface of the inner bottom 2 and having a horizontal distance between adjacent textures 10 of 0.5 to 3 cm, preferably of 1 to 2.5 cm.

Figure 1:
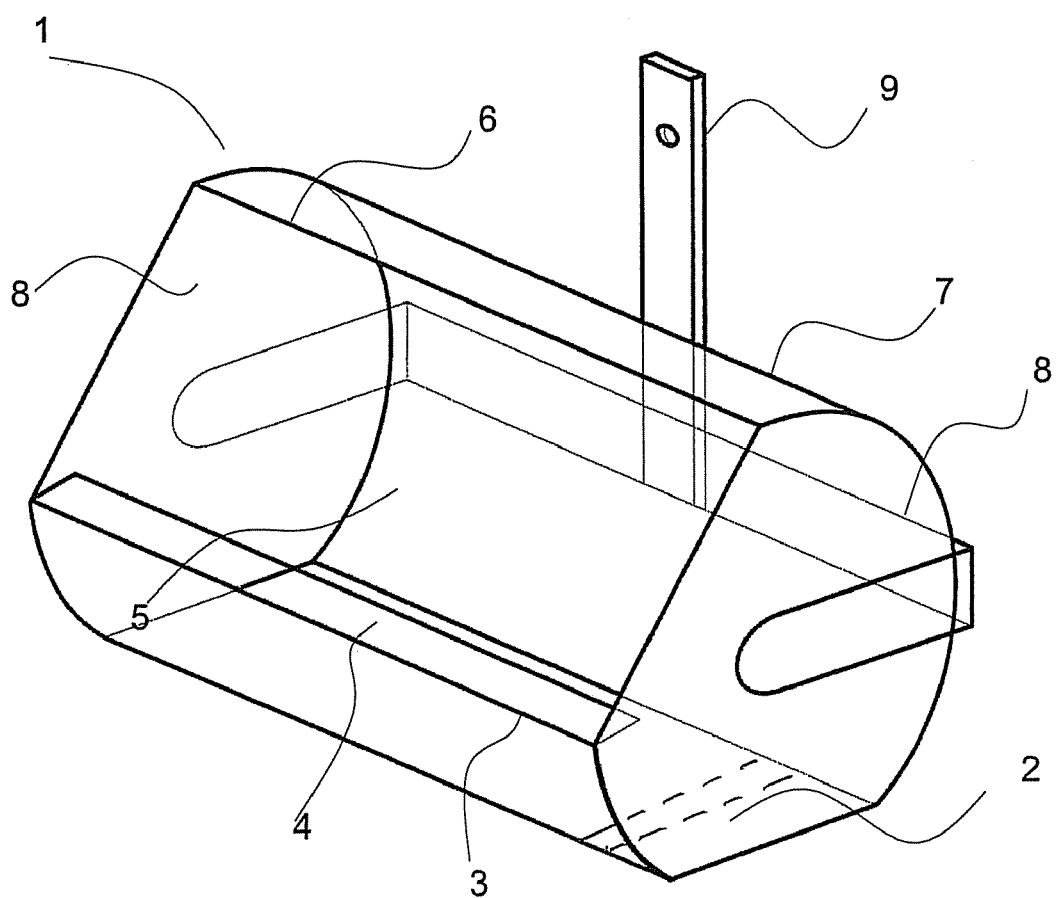
FIG. 1 shows an oblique front view of the present invention and FIG. 2 shows a cross sectional view of the present invention.
Figure 2:
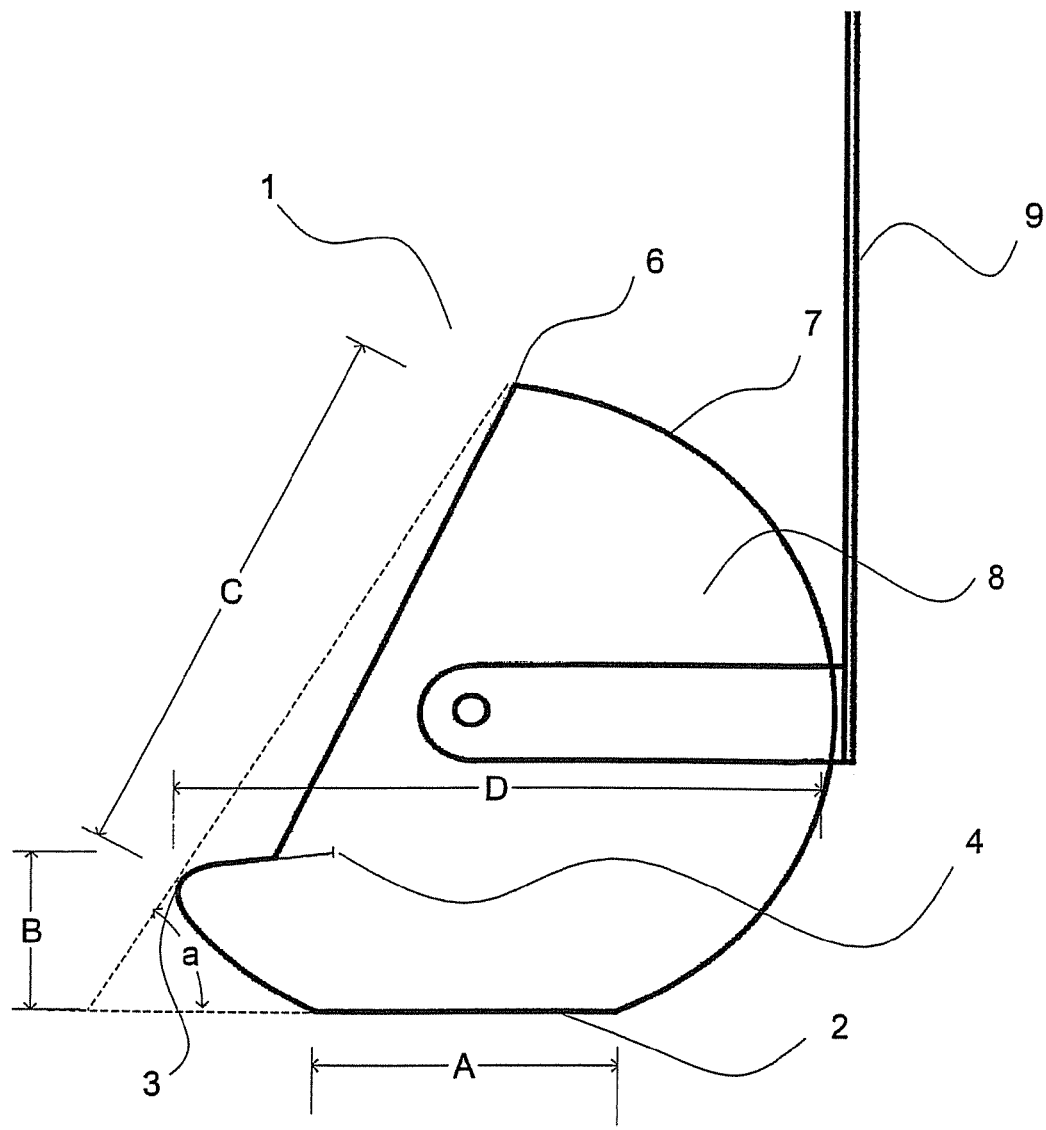
Figure 3:
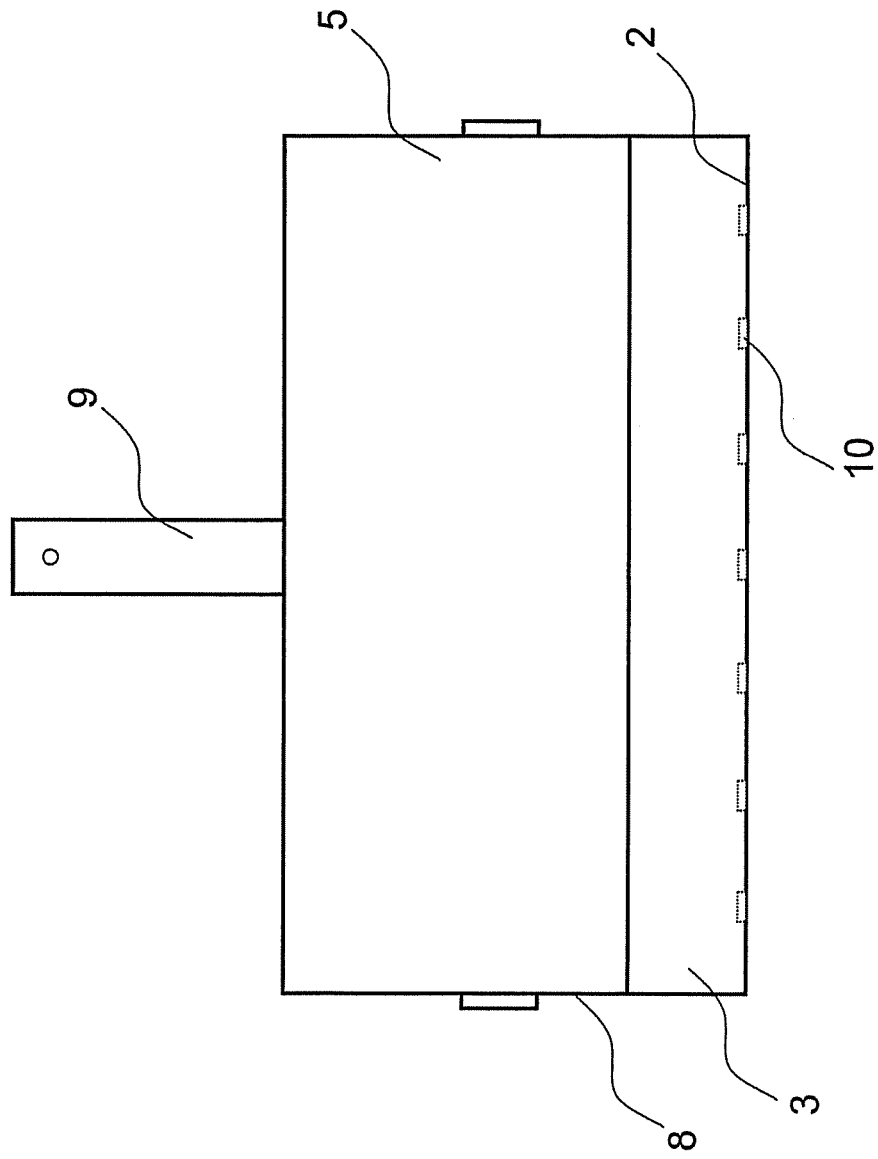
FIG. 3 shows a front view of the present invention.

A trough according to the preferred embodiment of the present invention is shown in an oblique view in FIG. 1 and in a cross sectional view in FIG. 2 in which the key dimensions of the trough are indicated with letters A to D. The trough 1 comprises an inner bottom 2 extending 25 cm in the longitudinal direction and 4 cm in the transversal direction A, a first longitudinal outer edge 3 extending the entire length of the front longitudinal edge of the said inner bottom 2 and 3.5 cm vertically above B the plane of said inner bottom 2. From the top of the said first longitudinal outer edge 3 a lip 4 extends 1.5 cm inward in the transversal direction from said first longitudinal outer edge 3 above said inner bottom 2. With an angle $\alpha$ of 45° in reference the transversal direction of the plane of said inner bottom 2 (shown in FIG. 2), an opening to the interior of the trough 5 extends the entire length of the first longitudinal outer edge 3 and 9 cm C upwards along the 45° angle from the first longitudinal outer edge to a second longitudinal outer edge 6 parallel to the first longitudinal outer edge 3. From the said second longitudinal outer edge 6 a curved back cover 7 forms the top portion and the back wall of the trough 1, wherein the horizontal distance from the first longitudinal edge 3 to the said back wall is 8 cm D. Both ends of the trough are covered with end walls 8, which are shaped to fit the transversal contours made up by the inner bottom 2, the first longitudinal outer edge 3, the lip 4, the angled opening 5 and the curved back cover 7. In order to convert the trough 1 between the two intended purposes; the trough 1 is fitted with a height adjustable bracket 9 which enables the trough 1 to be pivoted 180° around both the longitudinal and the transverse axis.

The invention claimed is:

1. A longitudinally extending trough for supplying piglets with mineral supplements in form of a dry powder mixture, comprising an inner bottom,
    two end walls preventing the piglets from entering the trough from ends in the longitudinal direction,
    a first longitudinal outer edge extending substantially a full distance between said two end walls and extending between 0.5 and 6 cm above the inner bottom, and
    a lip extending inward from said first longitudinal outer edge and for a distance of between 0.5 and 3 cm in a horizontal direction, the trough extending in a longitudinal direction between 5 and 35 cm from one of said end walls to the other,
    wherein said inner bottom is textured in a pattern, the texture extending vertically from 0.1 to 0.4 cm. from a general surface of the inner bottom and having a horizontal distance between adjacent textures of 0.5 to 3 cm.

2. A trough according to claim 1, further comprising a second longitudinal outer edge extending substantially the full distance between said two end walls and substantially parallel to said first outer edge, the first edge and the second edge defining an opening into an interior of the trough, wherein a width of the opening in a transversal direction is from 5 to 15 cm.

3. A trough according to claim 1, further comprising having a second longitudinal outer edge extending substantially the full distance between said two end walls and substantially parallel to said first outer edge, the first edge and the second outer edge defining an opening into an interior of the trough, wherein a plane of the opening defined by said first and said second longitudinal outer edges has an angle to horizontal of between 25 and 60 degrees.

4. A trough according to claim 1, further comprising a back wall extending upward from a longitudinal side of the inner bottom opposite the first longitudinal outer edge, so that there is a horizontal distance between the first longitudinal outer edge and the back wall of between 3 cm and 15 cm.

5. A trough according to claim 1, further comprising a back cover extending upward from a longitudinal side of the inner bottom opposite the first longitudinal outer edge, wherein an angle of the back cover between the inner bottom and the horizontal level of the lip is within the range of 20 to 90 degrees to horizontal.

6. A trough according to claim 1, wherein said inner bottom extends horizontally from 1 to 8 cm, in a transversal direction.

7. A trough according to claim 1, further comprising a supporting arrangement for supporting the trough in a first position for supplying piglets with the mineral supplements in form of a dry powder mixture and furthermore in a second position for supplying weaning piglets with feed, and thus enabling the trough to contain a suitable amount of solid feed for the piglets.

* * * * *